(12) United States Patent
Tang

(10) Patent No.: US 7,960,928 B2
(45) Date of Patent: Jun. 14, 2011

(54) FLUX CONTROLLED MOTOR MANAGEMENT

(75) Inventor: Yifan Tang, Los Altos, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 454 days.

(21) Appl. No.: 12/252,186

(22) Filed: Oct. 15, 2008

(65) Prior Publication Data

US 2010/0090629 A1  Apr. 15, 2010

(51) Int. Cl.
*H02P 6/08* (2006.01)
*G06F 19/00* (2006.01)
*H02M 3/335* (2006.01)

(52) U.S. Cl. ........... 318/400.09; 318/400.02; 318/400.3; 318/578; 318/801; 701/22

(58) Field of Classification Search .......... 318/432, 318/282, 366, 720, 722, 727, 801–803, 807, 318/400.02, 400.3, 400.9, 578; 701/22
See application file for complete search history.

(56) References Cited

U.S. PATENT DOCUMENTS

| | | | | |
|---|---|---|---|---|
| 3,855,512 A | * | 12/1974 | Konrad | 318/366 |
| 3,911,340 A | * | 10/1975 | Plunkett | 318/802 |
| 4,215,304 A | * | 7/1980 | D'Atre et al. | 318/758 |
| 4,215,305 A | * | 7/1980 | D'Atre et al. | 318/803 |
| 4,243,927 A | * | 1/1981 | D'Atre | 318/803 |
| 4,777,420 A | * | 10/1988 | Dadpey et al. | 318/758 |
| 5,057,760 A | * | 10/1991 | Dadpey et al. | 318/807 |
| 5,168,204 A | | 12/1992 | Schauder | |
| 5,386,186 A | | 1/1995 | Gritter | |
| 6,163,128 A | * | 12/2000 | Hiti et al. | 318/722 |
| 6,222,335 B1 | * | 4/2001 | Hiti et al. | 318/432 |
| 6,646,412 B2 | * | 11/2003 | Wu et al. | 318/801 |
| 6,683,428 B2 | * | 1/2004 | Pavlov et al. | 318/432 |
| 2003/0146723 A1 | * | 8/2003 | Pavlov et al. | 318/432 |
| 2003/0151385 A1 | * | 8/2003 | Wu et al. | 318/727 |
| 2007/0176584 A1 | * | 8/2007 | Chen | 323/282 |
| 2008/0100257 A1 | * | 5/2008 | Speckhart et al. | 318/807 |
| 2009/0261774 A1 | * | 10/2009 | Yuuki et al. | 318/720 |

OTHER PUBLICATIONS

Hofmann, H., et al., "Speed-sensorless vector torque control of induction machines using a two-time-scale approach", *IEEE Transactions on Industry Applications*, 34(1), (Jan.-Feb. 1998), 169-177.

Hofmann, H., et al., "Stator-flux-based vector control of induction machines in magnetic saturation", *IEEE Transactions on Industry Applications*, 33(4), (Jul.-Aug. 1997), 935-942.

Hofmann, H. F, et al., "Stator-flux-oriented vector control of synchronous reluctance Machines with maximized efficiency", *IEEE Transactions on Industrial Electronics*, 51(5), (Oct. 2004), 1066-1072.

(Continued)

*Primary Examiner* — Paul Ip
(74) *Attorney, Agent, or Firm* — Patent Law Office of David G. Beck

(57) ABSTRACT

A motor in an electric vehicle can be controlled by receiving at least one of a user input or vehicle information, selecting one of a plurality of available flux modes using at least one of the user input or the vehicle information, and calculating a control signal, using the selected flux mode, to control the motor of the electric vehicle.

17 Claims, 9 Drawing Sheets

OTHER PUBLICATIONS

Park, J. D, et al., "Design and control of high-speed solid-rotor synchronous reluctance drive with three-phase LC filter", *Conference Record of the 2005 Industry Applications Conference*, 2005. Fourtieth IAS Annual Meeting. vol. 1, (Oct. 2005), 715-722.

Park, Jae-Do, et al., "Feedforward control of high-speed solid-rotor synchronous reluctance machines with rotor dynamics model", *Conference Record of the 2004 IEEE Industry Applications Conference*, 2004, 39th IAS Annual Meeting, vol. 1, (Oct. 2004), 292-298.

Shearer, Tony L, et al., "Sensorless control of a thermoacoustic refrigerator", *J. Acoust. Soc. Am.*, 116(1), (Jul. 2004), 288-293.

Wang, Guanghui, et al., "Speed-sensorless torque control of induction machine based on carrier signal injection and smooth-air-gap induction machine model", *IEEE Transactions on Energy Conversion*, 21(3), (Sep. 2006), 699-707.

\* cited by examiner

FLUX CONTROLLED MOTOR MANAGEMENT

BACKGROUND

There are a number of negative aspects to burning fuel in an internal combustion engine to provide for transportation, such as cost, pollution, or the depletion of natural resources. Vehicles having electric or partially electric propulsion machinery address some of these problems.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

Figure 1A:
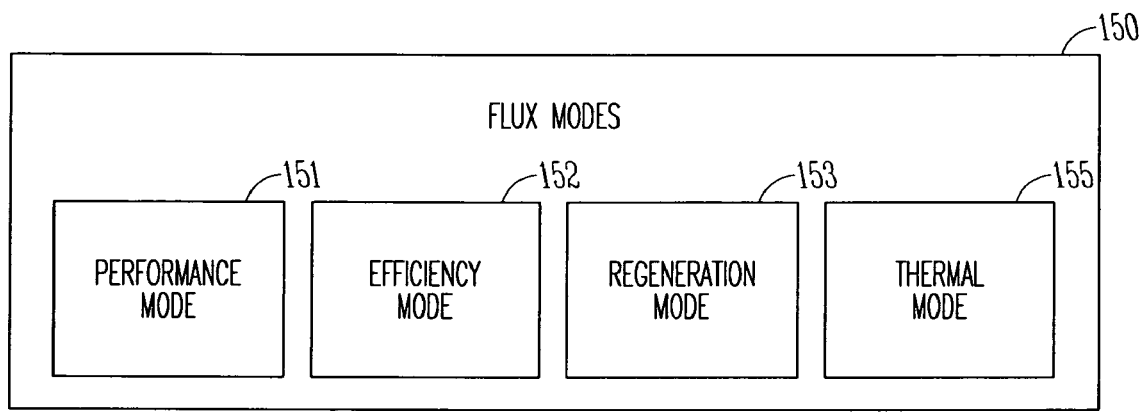
FIGS. 1A and 1B illustrate generally examples of a plurality of available flux modes.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Generally, a motor controller can be configured to, among other things, control the performance of a motor (e.g., an induction motor) of an electric vehicle. In applications having a limited power supply (e.g., a battery), the motor controller can be configured to control the motor at or according to one or more specified or determinable modes, such as a performance mode, an efficiency mode, a regeneration mode, a thermal mode, or one or more other modes.

In certain electric vehicle applications, however, utilizing one or more of the specified or determinable modes (e.g., maximizing or otherwise enhancing the performance, efficiency, regeneration, or thermal management) can be difficult while also controlling the motor to produce a desired torque or speed. The present inventor has recognized, among other things, that the flux linkage (or "flux") of a motor in an electric vehicle can be modulated according to the desired torque or one or more other user inputs or vehicle information to maximize or otherwise enhance or increase the performance, efficiency, regeneration, or thermal operation of the electric vehicle, or to decrease the power loss throughout the operating range of the electric vehicle. In an example, one or more limitations under consideration can include an inverter current, an inverter voltage, rotor heat dissipation, motor pull-out torque (or breakdown torque), battery charging power, or one or more other limitations, user input, or vehicle information.

In an example, in an electric vehicle application, an inverter current can be limited by the current rating of one or more power switching devices or by the thermal rise of the junction temperature of the one or more switching devices. In an example, an inverter voltage can be limited by the battery state-of-charge (e.g., a battery voltage, a direct current (DC) bus voltage, etc.). In certain examples, the inverter voltage can be limited due, at least in part, to a maximum modulation index of a switching power inverter between the DC bus and the motor.

In certain examples, the motor speed of operation can be divided into three ranges: low speed up to the base speed, where motor current is limited and motor voltage not limited by the inverter; above base speed up to a certain speed, where motor current is limited and motor voltage is limited by the inverter; and higher speeds, where motor current is not limited and motor voltage is limited by the inverter. In an example, the speed boundaries can depend on the battery voltage.

In an example, in the first speed range, the motor voltage can increase as speed goes up to maintain a certain constant flux level, until the voltage becomes limited by the inverter. The range of flux levels to meet the torque command can be large. As such, a flux level can be calculated or selected using one or more operating characteristics. In the second speed range, the motor voltage can still be adjusted to obtain a desired flux level, allowing the flux level to be calculated or selected using the one or more operating characteristics. However, in the second speed range, the range of flux levels capable of meeting the torque command can be more limited than in the first speed range. In the third speed range, the motor voltage can still be adjusted to obtain a desired flux level, allowing the flux level to be calculated or selected using the one or more operating characteristics. However, in the third speed range, the range of flux levels capable of meeting the torque command can be further limited. The motor current can be limited by the inverter rating in the first and second speed ranges, until the third speed range where the motor current can be limited by higher motor back-EMF voltage. In an example, the higher motor back-EMF voltage can require the motor current to reduce or to negate the effect of the inverter limit.

In certain examples, in the second and third speed ranges, it can be important to limit the motor slip to remain under a slip limit having some margin so that the pull-out torque is not exceeded. It can also be useful to not limit the slip so much as to decrease the acceleration of the electric vehicle at high speeds.

In other examples, the battery voltage can vary during the charge life of the battery, or the battery voltage can vary depending on the current draw of the battery, which can depend on the power being drawn from the battery. In an example, a minimal operational battery voltage can be 50% of the maximal operational battery voltage. In this example, in the first speed range, the variation in the battery voltage (hence the maximum inverter voltage) may not effect overall operation. However, in the second and third speed ranges, the battery voltage can play a significant role in obtaining an optimal flux level, as a full or nearly full battery voltage can be utilized at high torque loads.

In certain electric vehicle applications, one or more electronic or mechanical hardware components or parts can overheat faster than others, or can reach operating thermal limits sooner than others. In an example, this can be due to one or more operating characteristics of the one or more components, such as excessive heat generating losses, or can be due to a relatively higher difficulty to cool the one or more components. In certain examples, the rotor in the motor of the electric vehicle can be more difficult to cool than the stator, which can be directly coupled with high thermal conductivity to a motor frame having cooling means. In an example, rotor heat can be dissipated through a low thermal conductivity air-gap, bearings, or a shaft coupler to a mechanical load. In certain examples, it can be desirable to reduce rotor power losses to limit the rotor temperature rise to protect the bearings or other system components.

In various examples, one or more of the above considerations can apply to motor or generator operations. In certain examples, the generator operation can pose one or more additional issues, including battery charging power, energy limit, or one or more other issues. In an example, the battery charge current limit can be lower than the discharge current limit due, at least in part, to a charge equalization requirement.

In an example, one or more operating characteristics can affect an optimal flux command in electric vehicle applications. In an example, a desired operating characteristic can be selected, specified, or otherwise determined, and an optimal flux command can be calculated using the desired operating characteristic. In certain examples, one or more user inputs or vehicle information can be accounted for in determining the flux command, including motor speed, battery voltage, etc.

In certain examples, optimal flux control can be utilized using field orientation control to decouple control of a flux-producing current and a torque-producing current, or to switch from motoring to generating by keeping the flux-producing current and reversing the sign of the torque-producing current, resulting in a stator excitation synchronous frequency lower than the frequency of the rotor.

Figure 1B:
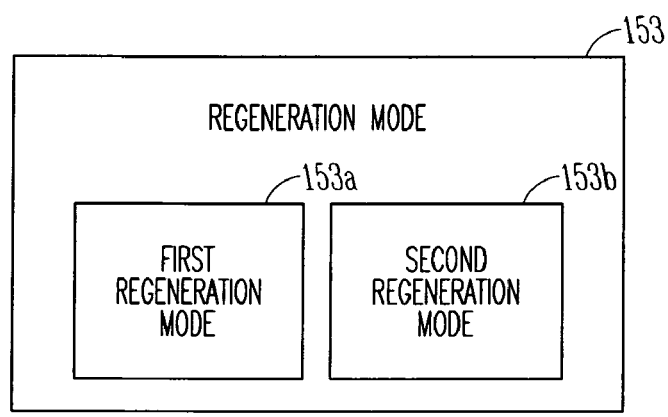

FIGS. 1A and 1B illustrate generally examples of a plurality of available flux modes 150. FIG. 1A illustrates generally that the plurality of available flux modes 150, or that one or more specified or determinable modes, can include at least one of a performance mode 151, an efficiency mode 152, or a regeneration mode 153. In other examples, the one or more specified or determinable modes can further include a thermal mode 155. FIG. 1B illustrates generally an example of the regeneration mode 153, including a first regeneration mode 153a and a second regeneration mode 153b.

In an example, the performance mode 151 can be configured to deliver a determinable available torque of the motor or the electric vehicle (e.g., a maximum, near maximum, or some other determinable amount of torque available with respect to the electric vehicle or with respect to the motor and limited by one or more of the remaining components of the electric vehicle, etc.).

In an example, the efficiency mode 152 can be configured to deliver a determinable efficiency or power loss of one or more of the motor or one or more components of the electric vehicle (e.g., a maximum, near maximum, or some other determinable amount of efficiency or power loss with respect to the electric vehicle or with respect to the motor and limited by one or more of the remaining components of the electric vehicle, etc.).

In an example, the regeneration mode 153 can be configured to deliver a determinable regeneration efficiency of the motor or the electric vehicle (e.g., a maximum, near maximum, or some other determinable amount of regeneration or regeneration efficiency with respect to the electric vehicle or with respect to the motor and limited by one or more of the remaining components of the electric vehicle, etc.), or to deliver a determinable amount of regeneration efficiency and braking assist to the electric vehicle (e.g., a maximum, near maximum, or some other determinable amount of braking assist with respect to the electric vehicle or with respect to the motor and limited by one or more of the remaining components of the electric vehicle, etc.). In the example of FIG. 1B, the first regeneration mode 153a can be configured to deliver a determinable regeneration of the electric vehicle, and the second regeneration mode 153b can be configured to deliver a determinable regeneration and a determinable braking assist to the electric vehicle.

In an example, the thermal mode 155 can be configured to deliver a determinable rotor cooling of the electric vehicle (e.g., a maximum, near maximum, or some other determinable amount of rotor cooling with respect to the electric vehicle or with respect to the motor and limited by one or more of the remaining components of the electric vehicle, etc.).

In other examples, one or more other modes can be configured to deliver one or more other determinable benefits to the electric vehicle.

In an example, calculating or maintaining an optimal flux level in an induction motor can be beneficial to a steady-state or dynamic performance of the induction motor throughout the speed range of operation. In certain examples, a flux level can be directly controlled by a power electronic module (PEM) output voltage. One or more methods can be used to determine a stator flux linkage command (e.g., as a function of a torque demand in one or more modes), such as by using an algorithm, a function, a lookup table, or one or more other calculations according to one or more modes. In an example, the stator flux linkage command can directly affect a d-axis voltage command in a stator field oriented control. In one or more other vector control schemes, one or more other flux linkages can be optimized.

In other examples, a flux weakening strategy can be implemented throughout the speed range of operation, such as by using one or more functions considering linear or nonlinear saturation instead of look-up tables. In an example, a work table or flux mode can be selected using an algorithm from one or more inputs, including a user input or vehicle information. In certain examples, the user input can include at least one of a torque command value, a traction control mode, a brake input, a performance mode, a regeneration preference or mode, or one or more other user inputs, and the vehicle information can include at least one of a motor speed, a vehicle acceleration, a battery status, a thermal reading, traction control information, or other vehicle information.

In an example, one or more flux modes (e.g., a performance flux mode, an efficiency flux mode, a regeneration efficiency flux mode, a thermal mode, etc.) can be selected using one or more driver inputs or vehicle information, and a control signal can be calculated using the selected flux mode, e.g., to control a motor of an electric vehicle.

In an example, a first flux value can be calculated at a desired torque value, the first flux value according to the selected flux mode, such as corresponding to a determinable (e.g., maximum, minimum, or one or more other determinable value or amount) performance, efficiency, regeneration efficiency, or thermal behavior of the electric vehicle. Further, a first torque-producing current value can be calculated as a function of the torque command value and of the first flux value, and the motor of an electric vehicle can be controlled using a control signal calculated using the first flux value and the first torque-producing current value.

Figure 2:
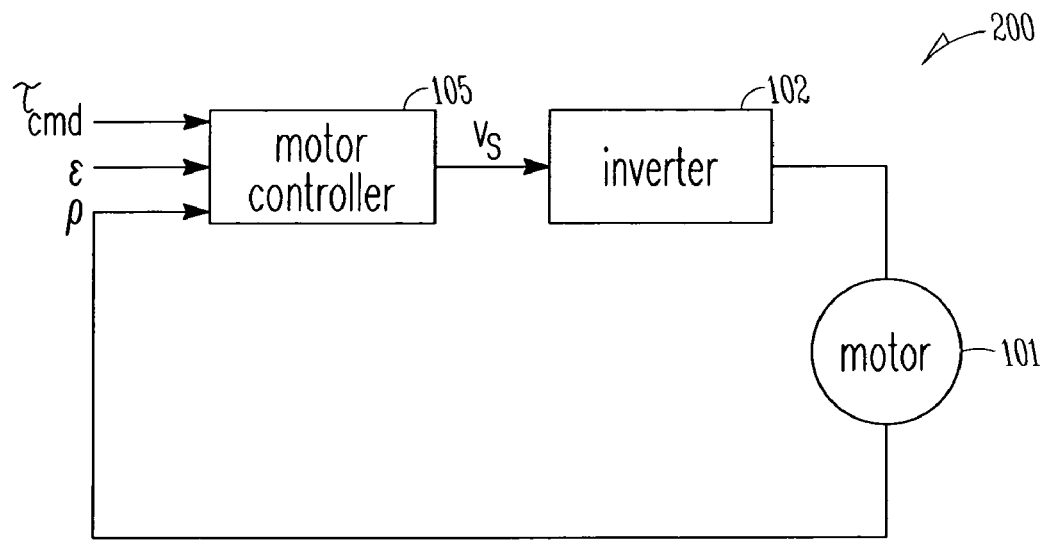
FIG. 2 illustrates generally an example of a system including a motor controller, an inverter, and a motor.

FIG. 2 illustrates generally an example of a system 200 including a motor 101, an inverter 102, and a motor controller 105. In an example, the motor controller 105 can be configured to receive a torque command value ($\tau_{cmd}$), an available energy signal ($\epsilon$), and at least one operating characteristic ($\rho$) of the motor 101, and output a control signal ($V_s$) for controlling the motor 101. The motor controller 105 can include a device or one or more electrical components configured to control the performance of the motor 101. In certain examples, the motor controller 105 can include an electric machine controller configured to control the performance of an electric machine, such as a generator or other electric machine.

In an example, the torque command value can include or otherwise be derived using information from a throttle or other electric vehicle speed or torque input (e.g., input from a user of the electric vehicle). In certain examples, the torque command value can be taken directly from the input from the user, or the torque command value can be modulated, such as by filtering the user input to obtain a smoother or more realistic response or acceleration, a more constant or stable speed or torque, or to apply one or more other driving features, such as traction control.

In an example, the drive electronics of the electric vehicle can include the motor controller 105, an inverter 102, or one or more other components. In various examples, the motor 101 of the electric vehicle can include various types of electric motors, such an alternating current (AC) induction motor, a synchronous AC motor, a DC motor, a reluctance motor, or other type of electric motor capable of providing power to propel an electric vehicle.

In an example, the available energy signal can include a signal indicative of the available voltage in the electric vehicle. In certain example, the electric vehicle can include a battery or other device capable of storing voltage, such as a capacitor. Thus, in certain examples, the available energy signal can include a signal indicative of the available voltage in the battery or other energy producing or energy storage device.

In an example, the at least one operating characteristic of the motor 101 can include a measured rotor speed ($\omega_r$), measured operating or phase current (e.g., $i_a$, $i_b$, or $i_c$), or one or more other measured or estimated operating characteristics of the motor 101.

In certain examples, the control signal for controlling the motor of the electric vehicle can vary depending on the type of motor. For example, the motor 101 can include a three-phase AC induction motor. The three-phase AC induction motor, in a variable torque application, requires AC power at a specified frequency or amplitude to create the desired torque. In this example, the motor controller 105 can be configured to produce a control signal including a voltage signal (e.g., $V_s$). In an example, the control signal or the voltage signal can include a vector quantity. In other examples, the motor controller 105 can be configured to produce a control signal including more than one DC voltage signal (e.g., $V_d$ and $V_q$, or $V_a$, $V_b$, and $V_c$, etc.) or to produce at least one other signal, such as at least one current signal or other AC or DC signal.

In the example of FIG. 2, the motor controller 105 is configured to output the control signal to an inverter 102. The inverter 102 can include an electronic circuit or component configured to convert DC power to AC power. In various examples, the inverter 102 can be included in the motor controller 105 so that the output of the motor controller 105 can be directly applied to the motor 101, or the inverter 102 can be a separate component from the motor controller 105 so that the output of the motor controller 105 is applied to the motor 101 through the inverter 102. In an example, the inverter 102 can be configured to receive the control signal (e.g., $V_s$) from the motor controller 105, convert the control signal into a corresponding AC power signal for the motor 101, and deliver the AC power signal to the motor 101. In various examples, at least one of the inverter 102 or the motor controller 105 is included in the drive electronics of the electric vehicle.

Figure 3:
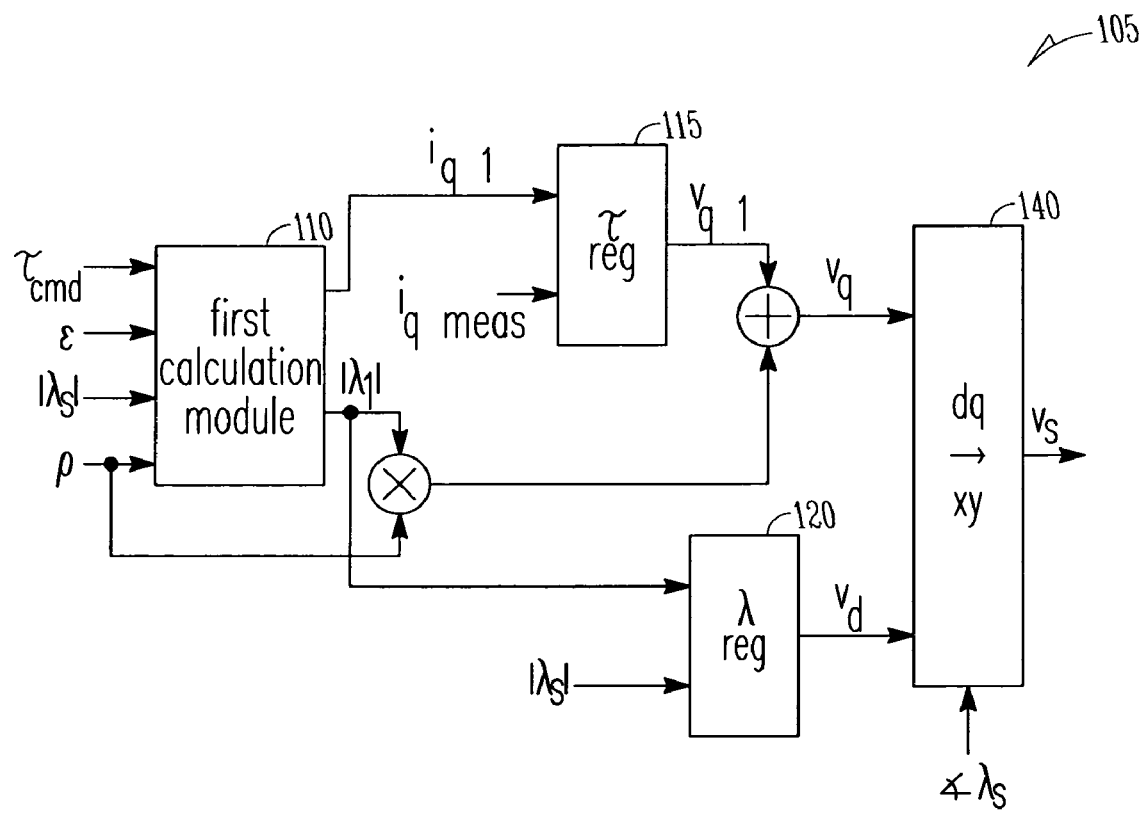
FIG. 3 illustrates generally an example of a motor controller including example motor controller components.

FIG. 3 illustrates generally an example of a motor controller 105 including a first calculation module 110, a torque ($\tau$) regulator 115, a flux ($\lambda$) regulator 120, and a rotating reference frame to stationary reference frame converter (dq→xy) 140.

In an example, the first calculation module 110 can be configured to calculate, at the received torque command value, a first flux value ($|\lambda_1|$) and a first torque-producing current value ($i_{q1}$) using the torque command value ($\tau_{cmd}$), the available energy signal ($\epsilon$), a magnitude of an estimated flux ($|\lambda_s|$), and the at least one operating characteristic ($\rho$) of the motor. In certain examples, the available energy signal can include a battery bus signal or a battery voltage signal, or the at least one operating characteristic can include a rotor speed ($\omega_r$) of the motor. In an example, the first flux value can be calculated to achieve a maximum efficiency of the electric vehicle. By achieving a maximum efficiency of the electric vehicle or minimizing power loss, the range or life of the power source or the vehicle can be extended. In certain examples, the first flux value corresponding to the maximum efficiency of the electric vehicle can be limited by a peak achievable flux of the motor or the electric vehicle at a specific operating point.

In an example, the torque regulator 115 or the flux regulator 120 can include a feedback mechanism or other regulator configured to stabilize or otherwise modulate or correct a difference between a measured value and a calculated value or a reference value.

In an example, the torque regulator 115 can be configured to output a first control value (e.g., a torque-related feedback control signal ($V_q$)) using the first torque-producing current value ($i_{q1}$) and a measured torque-producing current ($i_{qmeas}$). In certain examples, the torque regulator 115 can be configured to output a preliminary control value (e.g., a first torque-related feedback control signal ($V_q$)) using the first torque-producing current value ($i_{q1}$) and the measured torque-producing current ($i_{qmeas}$). The preliminary control value can be adjusted using the first flux value ($|\lambda_1|$) and the at least one operating characteristic ($\rho$) (e.g., the rotor speed ($\omega_r$)) of the motor to produce the first control value. In an example, the measured torque-producing current ($i_{qmeas}$) can be included as at least part of the at least one operating characteristic ($\rho$) of the motor.

In an example, the flux regulator 120 can be configured to output a second control value (e.g., a flux-related feedback control signal ($V_d$)) using the first flux value ($|\lambda_1|$) and the magnitude of an estimated flux ($|\lambda_s|$).

In an example, the rotating reference frame to stationary reference frame converter (dq→xy) 140 can be configured to convert the first control value and the second control value from the rotating reference frame into the control signal (e.g., $V_s$) in the stationary reference frame. In certain examples, the dq→xy 140 can include a converter or other device configured to perform an inverse park transform. In an example, the torque-related and flux-related feedback control signals can be converted using an angle of an estimated flux ($\angle\lambda_s$).

Figure 4:
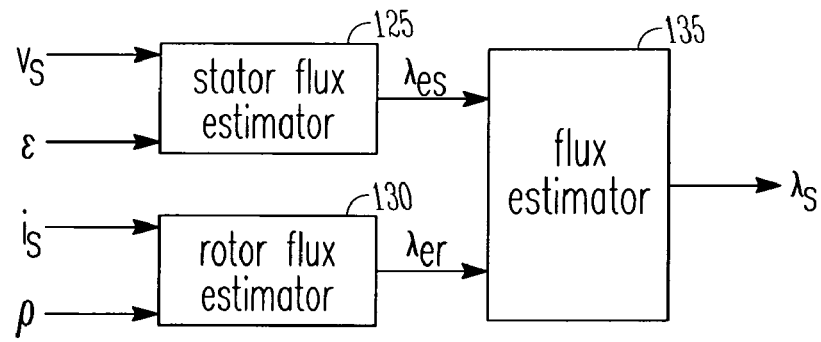
FIGS. 4-8 illustrate generally example motor controller components.

FIG. 4 illustrates generally example motor controller 105 components including a stator flux estimator 125, a rotor flux estimator 130, and a flux estimator 135.

In an example, the flux estimator 135 can be configured to calculate an estimated flux ($\lambda_s$) using a combination of an estimated stator flux ($\lambda_{es}$) and an estimated rotor flux ($\lambda_{er}$) of the motor. In the example of FIG. 4, the estimated stator flux ($\lambda_{es}$) can be calculated using the stator flux estimator 125, the estimated rotor flux and ($\lambda_{er}$) can be calculated using the rotor flux estimator 130, and the estimated flux ($\lambda_s$) can be calculated using the flux estimator 135.

In certain examples, the stator flux estimator 125 can be configured to calculate the estimated stator flux ($\lambda_{es}$) using the control signal ($V_s$) or an estimated phase voltage of the motor (e.g., the control signal ($V_s$) minus a voltage drop of a stator winding resistance for that phase). In an example, the stator flux estimator 125 can be configured to calculate the estimated stator flux ($\lambda_{es}$) using the control signal ($V_s$) or an estimated phase voltage of the motor coupled with the available energy signal ($\epsilon$). In certain examples, the stator flux estimator 125 can include a high-speed flux estimator or a voltage-based flux estimator.

In an example, the rotor flux estimator 130 can be configured to calculate the estimated rotor flux ($\lambda_{er}$) using the measured current ($i_s$) (e.g., the measured phase current or other measured current from the motor) and at least one operating characteristic ($\rho$) of the motor (e.g., the rotor speed ($\omega_r$) of the motor or other operating characteristic). In certain examples, the measured current ($i_s$) can include a vector quantity. Further, the flux estimator 135 can be configured to calculate the estimated flux ($\lambda_s$) using the estimated stator flux ($\lambda_{es}$) and the estimated rotor flux ($\lambda_{er}$). In certain examples, the rotor flux estimator 130 can include a low-speed flux estimator or a current-based flux estimator.

In an example, the stator flux estimator 125, the rotor flux estimator 130, or the flux estimator 135 can be configured to estimate at least one flux value such as is described in the commonly assigned Baglino et al. U.S. patent application Ser. No. 12/100,836, entitled "WEIGHTED FIELD ORIENTED MOTOR CONTROL FOR A VEHICLE," which is hereby incorporated by reference in its entirety, including its disclosure of estimating a flux, a rotor flux, or a stator flux.

Figure 5:
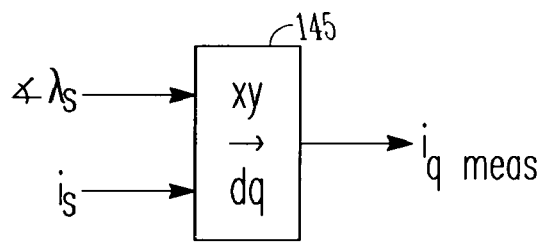

FIG. 5 illustrates generally an example motor controller component including a stationary reference frame to rotating reference frame converter (xy→dq) 145. In an example, the stationary reference frame to rotating reference frame converter (xy→dq) 145 can be configured to convert the measured current ($i_s$) and the angle of the estimated flux ($\angle\lambda_s$) from the stationary reference frame into the measured torque-producing current ($i_{qmeas}$) from the rotating reference frame. In certain examples, the xy→dq 145 can include a converter or other device configured to perform a forward park transform.

Figure 6:
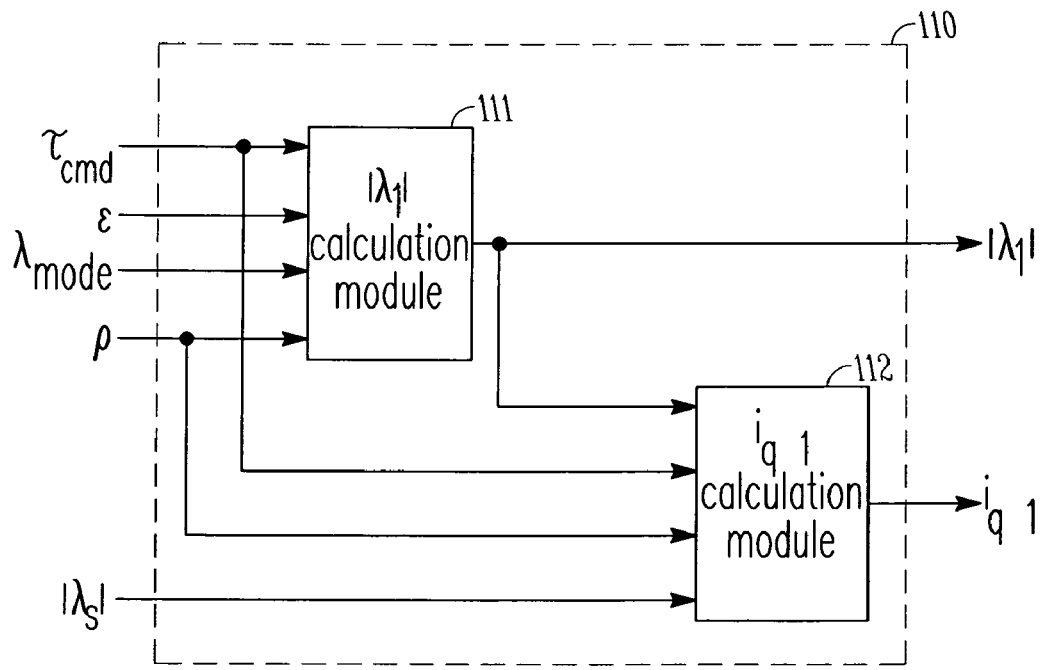

FIG. 6 illustrates generally an example of a first calculation module 110 including a first flux ($|\lambda_1|$) calculation module 111 and a first torque-producing current ($i_{q1}$) calculation module 112.

In an example, the first flux ($|\lambda_1|$) calculation module 111 can be configured to calculate the first flux value ($|\lambda_1|$) using the torque command value ($\tau_{cmd}$) and the available energy signal ($\epsilon$). In other examples, the first flux ($|\lambda_1|$) calculation module 111 can be configured to calculate the first flux value ($|\lambda_1|$) using at least one of the torque command value ($\tau_{cmd}$), the available energy signal ($\epsilon$), the at least one operating characteristic ($\rho$) (e.g., the rotor speed ($\omega_r$)) of the motor, or a flux mode input ($\lambda_{mode}$). In an example, the first flux value can be calculated using a relationship between at least one of the torque command value, the available energy signal, the at least one operating characteristic of the motor, or the flux mode input. In an example, the relationship can be dependent on the flux mode input. In certain examples, the flux mode can include at least one of a performance mode, an efficiency mode, or a regeneration mode. In an example, in addition to the at least one of the performance, efficiency, or regeneration mode, the flux mode can also include a thermal management mode configured to deliver a determinable rotor cooling in any one or more of the flux modes.

In certain examples, the flux mode input can include a user input, or the flux mode can be determined or otherwise inferred or calculated using at least one of vehicle information (e.g., a motor speed, a vehicle acceleration, a battery status, a thermal reading, traction control information, or other vehicle information) or user input (e.g., a torque command value, a traction control mode, a brake input, a performance mode, or other user input).

In an example, the flux mode input can include an efficiency mode input, and the first flux value can be calculated using a relationship configured to deliver a determinable efficiency (e.g., a maximum efficiency) or power loss of one or more of the motor or one or more components of the electric vehicle. In other examples, the flux mode input can include a performance mode input, and the first flux value can be calculated using a relationship configured to deliver a determinable available torque (e.g., a maximum available torque) of the motor or the electric vehicle. In an example, the flux mode input can include a regeneration mode input, and the first flux value can be calculated using a relationship configured to deliver a determinable regeneration efficiency (e.g., a maximum regeneration efficiency) to the motor or the electric vehicle or a determinable amount of braking assist (e.g., a maximum amount of braking assist) to the electric vehicle. In an example, the flux mode input can include a thermal mode, and the first flux value can be calculated using a relationship configured to deliver a determinable rotor cooling (e.g., a maximum rotor cooling) of the electric vehicle.

In certain examples, the first flux value can be limited by a peak achievable flux value of the motor or the electric vehicle at a specific operating point. In an example, the efficiency can be maximized by minimizing energy loss in the electric vehicle, including at least one electric vehicle component (e.g., the motor, the drive electronics, the transmission, etc.). In an example, once the first flux value is established, then first torque-producing current value ($i_{q1}$) can be calculated.

In an example, the first torque-producing current ($i_{q1}$) calculation module 112 can be configured to calculate the first torque-producing current value ($i_{q1}$) using the first flux value ($|\lambda_1|$) and the torque command value ($\tau_{cmd}$). In other examples, the first torque-producing current ($i_{q1}$) calculation module 112 can be configured to calculate the first torque-producing current value ($i_{q1}$) using the first flux value ($|\lambda_1|$), the torque command value ($\tau_{cmd}$), the at least one operating characteristic ($\rho$) of the motor, and the magnitude of an estimated flux ($|\lambda_s|$). In an example, the first torque-producing current value can be calculated to produce the desired torque at a determinable (e.g., the most efficient) first flux value. In certain examples, the first torque-producing current value can be limited by a peak achievable torque-producing current of the motor or the electric vehicle at a specific operating point.

Figure 7:
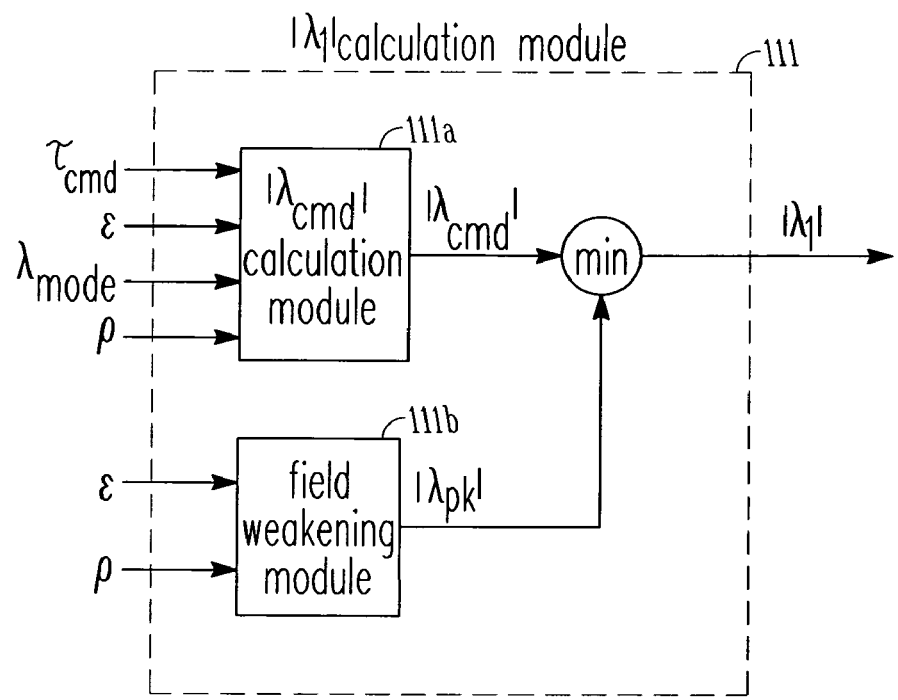

FIG. 7 illustrates generally an example of a first flux ($|\lambda_1|$) calculation module 111 including a flux command ($|\lambda_{cmd}|$) calculation module 111a and a field weakening module 111b.

In an example, the flux command ($|\lambda_{cmd}|$) calculation module 111a can be configured to calculate a flux command value ($|\lambda_{cmd}|$) using at least one of a torque command value ($\tau_{cmd}$), an available energy signal ($\epsilon$), at least one operating characteristic ($\rho$), or a flux mode input ($\lambda_{mode}$). In an example, the flux command value can be calculated according to a relationship between the flux mode input, a user input (e.g., the torque command value or other user input), and vehicle information (e.g., the available energy signal, the at least one operating characteristic, or other vehicle information). In an example, depending on the flux mode input, the relationship can be configured to maximize the performance, the efficiency, the regeneration efficiency, or the rotor cooling of the electric vehicle. In an example, the performance, the efficiency, the regeneration efficiency, or the thermal management of the electric vehicle can include the performance, the efficiency, the regeneration efficiency, or the thermal management of at least one of the motor, the power source (e.g., a battery or other source), the drive electronics, the power delivery system (e.g., a transmission), or other components of the electric vehicle having variable efficiency dependant upon at least one of a user input or vehicle information (e.g., the torque, the flux, the torque-producing flux, etc.) of the motor or motor controller.

In an example, for a given torque command value, the first flux value can be modulated while monitoring the power draw of the electric vehicle (e.g., using the available energy signal). The first flux value can be established as the flux value corresponding to a minimal power draw of the electric vehicle at the given torque command value. In various examples, the first flux value can be calculated corresponding to varying operating conditions.

In an example, one or more look-up tables can be created using the first flux value corresponding to the desired, calculated, or otherwise in-use flux mode. In an example, for the efficiency mode, the table can be created using the first flux value corresponding to a determinable efficiency (e.g., a minimal power draw) of the electric vehicle for at least one torque command value. In an example, the flux command ($|\lambda_{cmd}|$) calculation module 111a can be configured to receive at least one of a torque command value, an available energy signal, or at least one operating characteristic, and calculate, using the look-up table, the first flux value corresponding to the maximum efficiency or minimum power draw or loss of the electric vehicle at the received torque command value. In other examples, the maximum efficiency or minimum power draw or loss of the electric vehicle can be calculated during run-time (e.g., such as by modulating the first flux value for a received torque command value during run-time to find the maximum efficiency point). In other examples, similar tables can be created for each of the one or more flux modes, or for each of the one or more combinations of flux modes, according to the stated goals or justifications of each mode (e.g., to deliver a determinable available torque, to deliver a determinable efficiency, to deliver a determinable regeneration efficiency, to deliver a determinable rotor cooling, etc.).

In an example, the field weakening module 111b can be configured to calculate a peak flux value ($|\lambda_{pk}|$) using the available energy signal ($\epsilon$) and at least one operating characteristic ($\rho$) of the motor. In certain examples, the at least one operating characteristic of the motor can include the measured rotor speed ($\omega_r$). In an example, as the available energy in the electric vehicle changes, and as the speed of the rotor, or other operating characteristic of the motor, changes, the peak achievable flux can change. In certain examples, the peak achievable flux can be calculated using a relationship between at least one of the available energy of the electric vehicle or an operating characteristic of the motor. In other examples, the peak achievable flux can be derived, such as by testing or simulating the motor or motor controller through at least a portion of the operating range of the motor or the electric vehicle to find the peak achievable flux at a specific operating point and applying the derived results of the testing or simulation to a run-time operating point of the motor or of the electric vehicle.

In an example, the first flux ($|\lambda_1|$) calculation module 111 can be configured to calculate the first flux value ($|\lambda_1|$) as the minimum of the calculated flux command value ($|\lambda_{cmd}|$) and the peak flux value ($|\lambda_{pk}|$). In an example, the first flux value can correspond to the flux value having a maximum efficiency at a received torque command value, but limited by the peak achievable flux of the motor or the electric vehicle.

Figure 8:
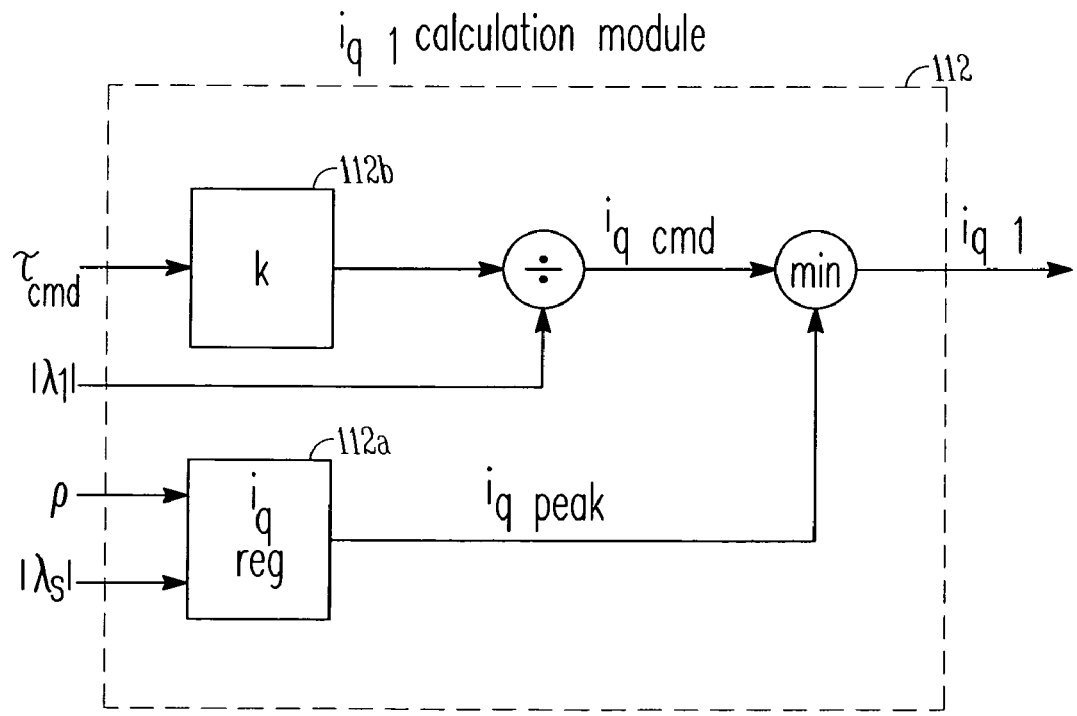

FIG. 8 illustrates generally an example of a first torque-producing current ($i_{q1}$) calculation module 112 including a torque-producing current ($i_q$) regulator 112a.

In an example, the first torque-producing current ($i_{q1}$) calculation module 112 can be configured to calculate a torque-producing current command value ($i_{qcmd}$) as a linear function of torque command value ($\tau_{cmd}$) and the first flux value ($|\lambda_1|$). The torque-producing current command value can correspond to the torque-producing current that produces the torque command value at the first flux value. In the example of FIG. 8, the torque-producing current command value is calculated according to a linear relationship 112b between the torque command value, K (where K is a constant determined by the number of poles or phases in the motor), and the first flux value.

In an example, the torque-producing current ($i_q$) regulator 112a can be configured to calculate a peak torque-producing current value ($i_{qpeak}$) using the at least one operating characteristic ($\rho$) of the motor and the magnitude of the estimated flux ($|\lambda_s|$). In an example, the peak torque-producing current value can change as a function of at least one operating characteristic (e.g., the measured rotor speed ($\omega_r$)) of the motor and the estimated flux of the motor.

In an example, the first torque-producing current ($i_{q1}$) calculation module 112 can be configured to compute the first torque-producing current value ($i_{q1}$) as a function of the torque-producing current command value and the peak torque-producing current value. In certain examples, the torque-producing current command value can be limited by the peak torque-producing current value.

Generally, the torque command value, the first flux value, the first torque-producing current value, the command signal, or other value can include a single value, or can include a real-time or run-time value that changes, such as depending on user input or other operating change. In an example, the motor controller 105 can be configured to receive a run-time torque command signal and compute or adjust a run-time flux value of the motor during operation of the motor in the electric vehicle. In certain examples, the run-time flux value can be adjusted according to the run-time torque command signal, and the adjusting can include according to one or more of a determinable performance, efficiency, regeneration efficiency, or thermal management of the electric vehicle. Further, one or more of the values above (e.g., the estimated flux ($\lambda_s$) the estimated stator flux ($\lambda_{es}$), the estimated rotor flux ($\lambda_{er}$), the measured current ($i_s$), etc.) can include a scalar quantity or a vector quantity.

Figure 9:
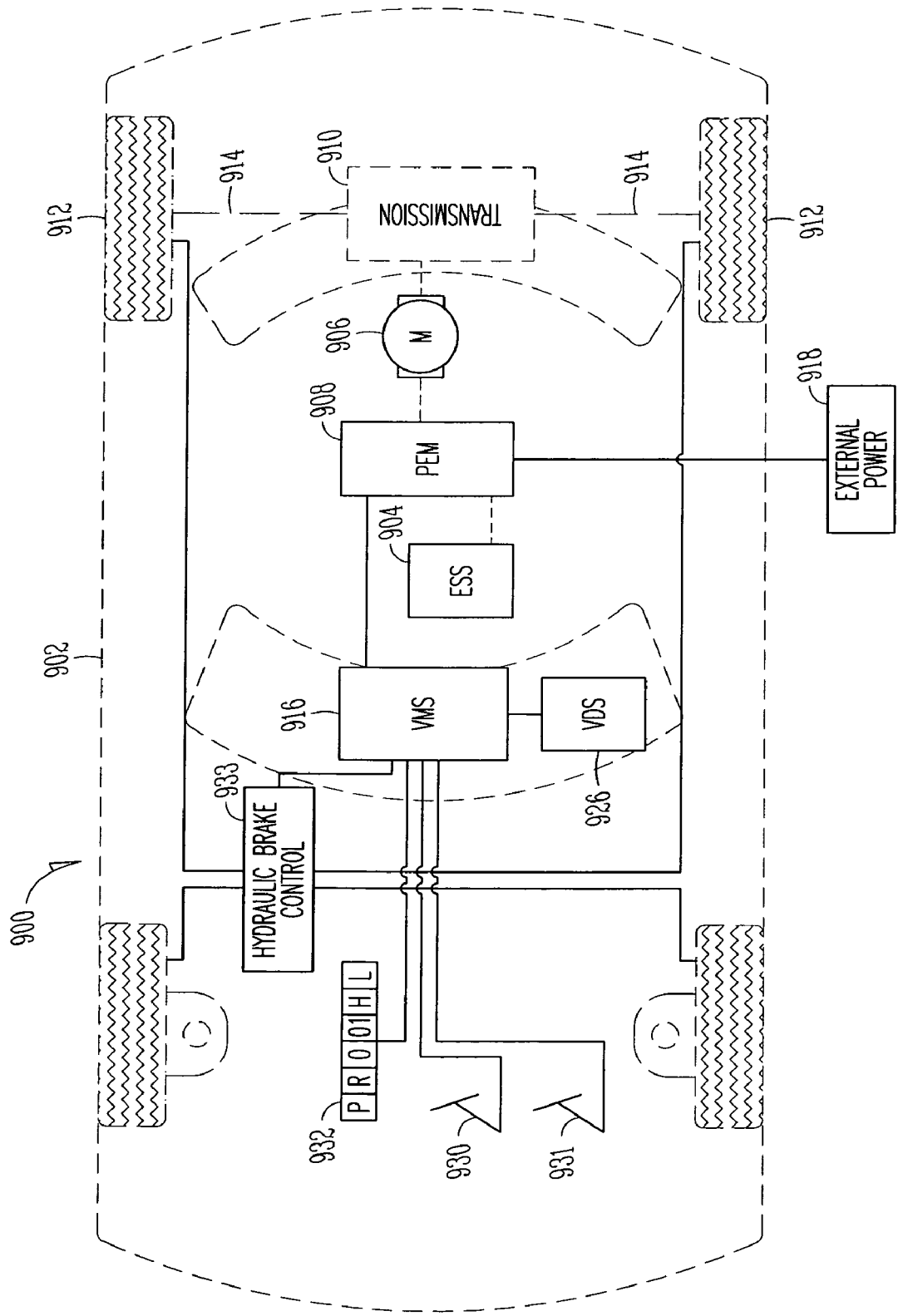
FIG. 9 illustrates generally an example of an electric vehicle.

FIG. 9 illustrates generally an example of a system 900 including an electric vehicle 902. In certain examples, the vehicle 902 can include an energy storage system (ESS) 904 configured to store energy (e.g., electric energy), and at least one propulsion motor, such as a propulsion motor 906, configured to convert the stored energy (e.g., battery energy, such as from the ESS 904) into mechanical motion, such as a rotary motion. In an example, the vehicle 902 can include a power electronics module (PEM) 908 configured to convert energy from the ESS 904 into energy usable by the at least one propulsion motor 906. In other examples, the vehicle 902 can include a transmission 910, one or more wheels 912, one or more axles 914, a vehicle management system (VMS) 916 configured to provide control for one or more of the ESS 904 or the PEM 908, an external power module 918, a vehicle display system (VDS) 926 configured to provide information to a user, a throttle input 930 (or a torque command input), a brake input 931, a driver console 932 configured to allow the driver to select one or more specified or determinable modes, or a hydraulic brake control module 933.

In an example, the ESS 904 can include one or more batteries used to provide power or energy to the vehicle 902. In certain examples, the one or more batteries can include various battery types or configurations. In an example, the one or more batteries can include one or more battery packs each having a plurality of electric cells. In an example, the plurality of electrical cells can include a plurality of lithium ion cells coupled in parallel or series, multiple flat electrical cells in a stack positioned perpendicular to their major surfaces, or one or more other types or configurations of electric cells. In an example, a stack can include a configuration of cells placed onto one another in alignment. In an example, each cell in the configuration of cells can include a substantially coextensive perimeter.

In an example, the one or more battery packs can be coupled, stacked, or otherwise connected using one or more structures, such as one or more busbars, collector plates, or other structures. In an example, the one or more battery packs can include a housing to contain the stack of electrical cells. In certain examples, several battery packs can be connected in parallel or series, such as by electrically connecting multiple collector plates of multiple battery packs.

In an example, one or more cells of the one or more battery packs can include a flat cell having major first and second surfaces that are substantially parallel to each other. In an example, the thickness of the flat cell is the distance between the first and second major surfaces. In an example, the thickness of the flat cell can be smaller than the perimeter dimensions of either of the first or second major surfaces.

In an example, a first plurality of cells can be connected in parallel to define a first battery pack and a second plurality of cells can be connected in parallel to define a second battery pack. In certain examples, the first pack and the second pack can be connected in series. In an example, a pack useful as a city car can include a small number of cells (e.g., 2 to 3 cells). Generally, the city car can have a smaller size (e.g., 3.4 to 3.6 meters long) and a more limited range requirement (e.g., 40 miles, etc.) than a typical passenger car. In other examples, a pack useful as a passenger car can include a larger number of cells (e.g., 8 cells, etc.). Generally, the passenger car can be longer or larger than the city car. In certain examples, each cell can be configured to store an amount of energy (e.g., 73 watt-hours, etc.).

In an example, battery voltage, and consequently, pack voltage, can often range from around 4.2 volts to about 2.8 volts in use. In an example, the voltage range can include individual cell variance. In certain examples, however, the ESS 904 can maintain a steady operating voltage. In an example, 9 battery packs can be connected in series to define a module having approximately 35 volts. In an example, the ESS 904 can include 11 modules connected in series having a combined approximately 400 volts.

In an example, the ESS 904 can include a state of charge circuit to monitor the state of charge of the one or more batteries. The state of charge circuit can count coulombs, watt-hours, or provide one or more other measures of the quantity of energy in the one or more batteries. In certain examples, the state of charge can be determined by measuring the open circuit battery voltage or by measuring the battery voltage driving a known load. In other examples, the state of charge circuit can optionally provide additional battery information, such as temperature, rate of energy use, number of charge/discharge cycles, or other battery information (e.g., information relating to battery state, etc.).

In an example, the ESS 904 can include one or more components associated with transmitting energy to or from the one or more batteries, including safety components, cooling components, heating components, rectifiers, one or more other components, or combinations thereof. In other examples, other configurations of one or more vehicle propulsion batteries are possible.

In an example, the ESS 904 can include a primary battery and a secondary battery. In an example, the primary battery can include one or more battery packs each having one or more battery cells, such as described above. In an example, the secondary battery can be rechargeable, at least in part, using electricity rather than chemicals or other materials. In other examples, various secondary battery chemistries can be contemplated, including lithium ion chemistries such as lithium polymer, lithium iron phosphate, nickel metal hydride, lead acid, or other chemistries.

In an example, the PEM 908 can be included as a portion or component of a system to convert energy from the one or more batteries into energy useable by the propulsion motor 906. In other examples, the propulsion motor 906 can be used to provide energy for the one or more batteries. In these examples, the PEM 908 can convert the energy provided by the propulsion motor 906 into energy that can be stored in the one or more batteries. In certain examples, the PEM 908 can include one or more transistors, such one or more field effect transistors (FETs) (e.g., one or more metal oxide semiconductor FETs, etc.), one or more bipolar transistors (BJTs) (e.g., one or more insulated gate BJTs, etc.), or one or more other transistors. In certain examples, the PEM 908 can include a switch bank configured to receive a DC power signal from the one or more batteries or ESS 904 and to output a three-phase AC signal to power the propulsion motor 906, or to convert the three-phase power from the propulsion motor 906 to DC power to be stored in the one or more batteries. In other examples, the PEM 908 can be used to convert energy from the one or more batteries into energy usable by electrical loads other than the propulsion motor 906, such as one or more 12V electronic applications.

In an example, the propulsion motor 906 can include one or more three-phase AC induction motors. In certain examples, the vehicle 902 can include a transmission 910 or one or more other gearboxes. In an example, the transmission 910 can include a single-speed transmission, or the transmission 910 can include more than one speed. In certain examples, one or more manually clutched transmissions (e.g., transmissions having hydraulic, electric, electrohydraulic clutch, or other actuation, etc.) can be used. In an example, a dual-clutch system can be used that, during shifting, can phase from one clutch coupled to a first gear to another clutch coupled to a second gear. In an example, rotary motion can be transmitted from the transmission 910 to one or more wheels 912 using one or more axles 914.

In an example, the VMS 916 can be configured to provide control (e.g., power control) for one or more batteries, the ESS 904, or the PEM 908. In certain examples, the VMS 916 can be coupled to a vehicle system configured to monitor a safety system, such as one or more crash sensors or other safety systems. In certain examples, the VMS 916 can be coupled to one or more driver inputs, such as an acceleration input.

In an example, an external power module 918 can be configured to provide power to the PEM 908. In an example, the PEM 908 can be configured to convert energy to a form that can be stored by the one or more batteries. In an example, the external power module 918 can include a charging station coupled to a municipal power grid or other power source. In certain examples, the charging station can convert power from an AC power source into power storable by the one or more batteries. In other examples, the PEM 908 can be configured to convert energy from the one or more batteries into power usable by the AC power source.

In an example, the VDS 926 can be configured to provide a visual indicator of information from one or more components of the system 900. In an example, the VDS 926 can include a display configured to provide information relating to a state of charge of one or more batteries of the vehicle 902.

In an example, the throttle input 930 and the brake input 931 can include a torque command input and brake input configured to provide a user throttle or torque command and a braking command to the VMS 916 or to one or more other components of the system 900.

In an example, the driver console 932 can include one or more selections configured to allow, directly or indirectly, a user to select one or more selectable or determinable modes. In other examples, the one or more selectable or determinable modes can be applied without direct user selection, instead determined from the one or more other user inputs (e.g., torque command, etc.) or vehicle information (e.g., motor speed, acceleration, traction control, state of charge, etc.).

In certain examples, the driver console 932 can include a combination gear and mode selection console. In the example of FIG. 9, P can include a parking gear selection, and R can include a reverse gear selection. In an example, a moving gear selection, unless otherwise noted, such as R or reverse, can automatically default in one or more of the selectable or determinable modes, such as the efficiency mode. Further, in the example of FIG. 9, D can include a forward gear selection configured for normal driving conditions. In an example, under acceleration or driving at a constant or near constant velocity, D can be configured to operate in the efficiency mode, and under deceleration or normal braking, D can be configured to operate in the first regeneration mode. In the example of FIG. 9, D1 can include a forward gear selection configured to performance driving conditions. In an example, under acceleration or driving at a constant or near constant velocity, D1 can be configured to operate in the performance mode, and under deceleration or braking, D1 can be configured to operate in the second regeneration mode. In an example, under acceleration or driving on a substantial uphill or upslope, H can include a forward gear selection configured to operate in the conjunction of the performance mode and the thermal mode with rotor loss cutback to allow for the continuous high torque to be available over longer time duration, and under deceleration or braking still on the substantial uphill or upslope, H can be configured to operate in the conjunction of the first regeneration mode and the thermal mode with rotor loss cutback. In an example, under acceleration or driving on a substantial downhill or downslope, L can include a forward gear selection configured to operate in the conjunction of the efficiency mode and the thermal mode with rotor loss cutback to allow for the continuous maximum driving efficiency without rotor overheating, and under deceleration or braking still on the substantial downhill or downslope, L can be configured to operate in the conjunction of the second regeneration mode and the thermal mode with rotor loss cutback to allow for maximum energy recovery over longer time duration. In other examples, H and L can provide standalone regeneration settings independent of the drive settings D and D1. In an example, H can include a regeneration gear selection configured to provide the first regeneration mode with lower regeneration torque, and L can include a regeneration gear selection configured to provide the second regeneration mode with a higher regeneration torque. In an example, the higher regeneration torque can be configured to provide more deceleration than lower regeneration torque.

In the example of FIG. 9, the hydraulic brake control module 933 can be coupled to the VMS 116, and can be configured to control one or more mechanical wheel brakes of the electric vehicle 902. In an example, the VMS 116 can provide one or more optimized commands to the hydraulic brake control module 933 and the PEM 908 to control the vehicle deceleration or braking by using one or more inputs from the one or more of the throttle input 930, the brake input 931, the driver console 932, or other vehicle information.

Other Examples

In an example, when a hard acceleration is detected or selected, the performance mode can be selected to provide a flux to deliver a determinable available torque of the electric vehicle, such as by selecting a table that is calibrated for a maximum (or other determinable amount) torque per amp with respect to the maximum available torque under PEM current limit, which in certain examples may not be the most efficient or have the best power factor.

In an example, when normal or continuous driving is detected or selected, the efficiency mode can be selected to provide a flux to deliver a determinable efficiency of the electric vehicle, such as by selecting a table that is calibrated for a maximum (or other determinable amount) system efficiency. In one or more examples, thermal feedback from a motor or PEM can also be used to select the flux mode. In an example, one or more transitions can be used when switching between modes, such as to avoid stability glitches or one or more other problems.

In an example, when deceleration or regeneration is detected or selected, the regeneration mode can be selected to provide a flux to deliver a determinable regeneration efficiency of the electric vehicle, such as by selecting a table that is calibrated for a maximum (or other determinable amount) regeneration efficiency. In an example, by switching away from the performance mode, the motor current can be significantly reduced, the regeneration efficiency can be increased, and the motor or PEM heating can be reduced. In other examples, in regeneration mode, flux level compensation as a function of motor speed can be beneficial for minimizing or reducing motor or PEM losses and allowing for energy recovery, especially while in low speed regeneration range. In an example, one or more stresses on the PEM or ESS during prolonged or aggressive regeneration can be reduced using regeneration control dynamic improvement through dynamic flux control of the motor.

In certain examples, it can be beneficial to select a flux level to minimize rotor loss, as the rotor is much more difficult to cool with much higher thermal resistance to ambient cooling (through shaft, bearings and airgap) than the stator. In an example, rotor copper losses can be reduced by operating in a higher flux level, even while the stator current (and hence, stator copper losses) is correspondingly higher. The dynamic loss balancing can often be useful as the temperature stress distribution inside the motor is often quite uneven. In an example, a rotor temperature estimation algorithm based on measurable parameters can provide another input to determining optimal flux or flux mode.

In certain examples, a vehicle traction control can affect the motor torque demand of the electric vehicle, and can affect the optimal flux level indirectly. In other examples, the driver can have the ability to set or establish one or more regeneration preferences, such as a maximum allowable high regeneration, a maximum allowable low regeneration, or no regeneration. In an example, the setting or establishing the one or more regeneration preferences can affect the optimal flux level or driving feel. In an example, the setting or establishing the one or more regeneration preferences can be accomplished using a gear selection of the electric vehicle alone or in combination with a brake or accelerator paddle or other input. In certain examples, one or more algorithms or tables can be used to optimize or otherwise alter the regeneration behavior (e.g., through flux control) using at least one of a battery state-of-charge or thermal feedback from the ESS, the PEM, or the motor.

Flux Command for Maximum Motoring Dynamics

In an example, the flux command for a determinable (e.g., maximum) efficiency and a determinable (e.g., maximum) dynamics (or performance) can be different throughout a range of operation of speed or torque in a motor. In an example, at speeds lower than a base speed and a high torque command, maximum efficiency control generally does not result in maximum torque per amp. As such, at the inverter current limit, a higher torque can be obtained if the flux command for maximum dynamics is used.

Figure 10:
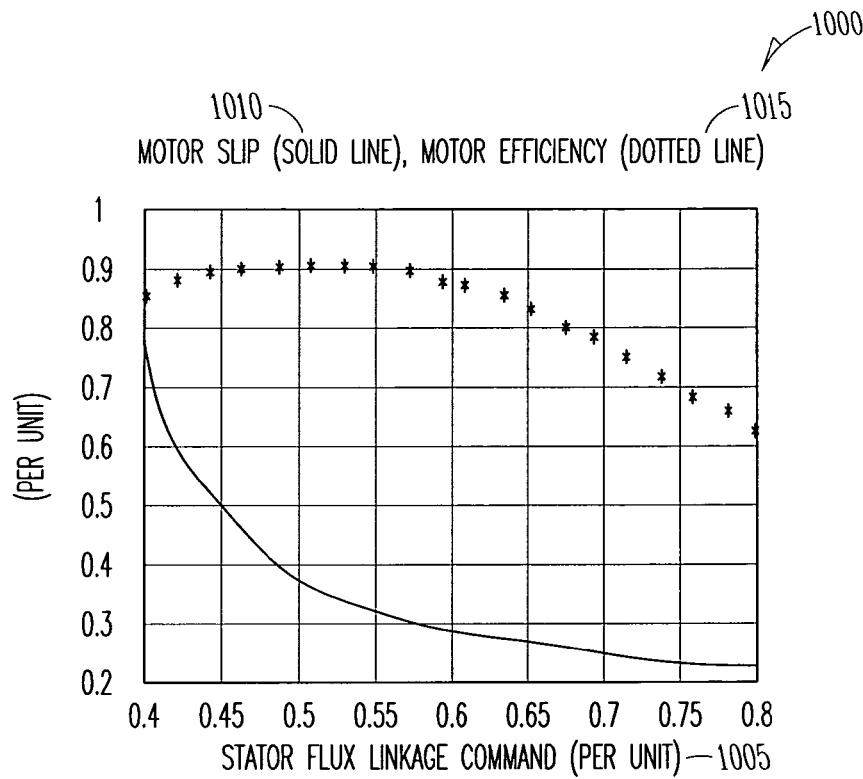
FIGS. 10-12 illustrate generally examples of vehicle operation information.

FIG. 10 illustrates generally an example of a relationship 1000 between a stator flux linkage command 1005, motor slip 1010, and motor efficiency 1015 at a partial load or a lower than peak torque command. In an example, at a lower torque command (or partial load), maximum efficiency control can demand a lower flux level. By operating at a higher flux level, the motor can operate at a lower slip frequency (such as shown in the example of FIG. 10), which can result in a faster response to torque command changes, and thus a faster acceleration or deceleration response. In certain examples, due to the total limited inverter current, the higher flux level still does not reach a full flux level in order to reserve the torque-producing current component from the magnetizing current component. Generally, the efficiency is not maximal, as, in certain examples, more magnetizing current can be required to maintain the higher flux. In an example, copper loss and iron loss may be higher. By operating at the higher flux level, the field orientation control can be more robust, more insensitive to undesirable cross-coupling of the flux and torque axes, or more insensitive to one or more motor parameter variations or estimator errors. In an example, the flux transient can be removed or reduced, and the dynamic bandwidth of the torque-producing current can be widened. In certain examples, the appropriate flux level can be selected through experimental or simulation characterization.

In an example, at speeds higher than the base speed, the above can still be true. In all speed ranges, the peak torque-speed capability curve with a flux command for maximum dynamics can be higher than that with a flux command for maximum efficiency. In addition, at the higher speed ranges, optimal flux command can increase the pull-out torque limit while maintaining the inverter current limit when the torque command is increased to approach the higher pull-out torque. In certain examples, the pull-out torque is not a concern at the first speed range. Further, at a partial load, the lower slip resulting from the maximum dynamic control can improve the dynamic response of the electric vehicle.

Thus, throughout the speed ranges, the performance mode can be selected when the vehicle is commanded to accelerate at or near full throttle, so that the acceleration can be faster under the same current limit. In other examples, the performance mode can be selected when the vehicle is unable to climb a steep hill at a reasonable speed, under the same current limit, or when the vehicle is in a rough terrain with large or small pot holes or obstacles. In various examples, the performance mode can be selected when the vehicle is on a slippery surface, where fast and stable vehicle response can be required or where a slower torque dynamic can result in unstable vehicle operation or may not be able to follow an optimal vehicle traction control. In an example, the performance mode can be selected as a preferred setting for a high performance car, such as a sports car, a track car, or other high performance vehicle.

In an example, at speeds higher that the base speed, the flux command for the maximum dynamics can depend on the battery voltage. Generally, with a higher available battery voltage than a nominal battery voltage, a lower flux command can allow a higher torque, whereas with lower available battery voltage than the nominal voltage, a higher flux command can allow a higher torque. This type of relationship can apply to the second or third speed ranges of operations. In an example, the nominal voltage can be a result of a motor winding or lamination design. Therefore, it can be desirable to apply a correction to the flux command as a function of the measured or estimated battery voltage, such as by using a lookup table or a parametric function. The result can include an increased pull-out torque or a maintained maximum dynamic response when the battery voltage widely varies.

Flux Command For Maximum Motoring Efficiency

In an example, at normal driving at a steady speed or slow dynamics, maximum efficiency control can be preferred to extend the range of the vehicle before recharge of the battery or other power source or supply. In an example, the efficiency can include a motor efficiency or motor drive system efficiency.

In an example, the flux level for a determinable (e.g., a maximum) efficiency can depend on a battery voltage. Generally, with a higher available battery voltage than the nominal, a lower flux command can allow a higher efficiency, whereas with a lower available battery voltage than the nominal, a higher flux command can allow a higher efficiency. In certain examples, this relationship can apply to the second or third speed ranges of operations. Therefore, it can be desirable to apply a correction to the flux command as a function of the measured or estimated battery voltage, such as by using a lookup table or a parametric function, the result of which can include a maintained maximum efficiency when battery voltage varies.

Flux Command for a First Regeneration Setting

In an example, the first regeneration setting or mode can include a torque limit mode. In certain examples, such as during vehicle deceleration or downhill driving, regeneration can convert mechanical power into electrical power to charge the battery. In an example, during the charging, the motor can be controlled to function as a generator with a negative torque command and a stator synchronous excitation frequency can be controlled to be slower than a rotor mechanical frequency. In an example, the first regeneration setting or mode can include an inverter current limit. Further, the first regeneration setting or mode can include an inverter voltage limit. In certain examples, the inverter voltage limit can increase during regeneration and the maximum increase can be limited for the protection of the battery or one or more switching devices. In various examples, the three speed ranges of operation described above can still apply.

In an example, a main regeneration limitation can include the maximum regeneration power or energy that can be absorbed by the battery and the associated maximum voltage increase. The regeneration torque command can be limited and the limited regeneration torque command can be approximately inversely proportional to the motor speed to maintain the regeneration power limit. The regeneration torque command can include a combined effect of traction control, throttle setting, or the maximum regeneration power. In addition, it can be limited to limit the deceleration rate so that the driving experience of an electric vehicle can be similar to that of a conventional vehicle.

In an example, a maximum efficiency can be desirable. In certain examples, operating under maximum efficiency can limit the losses or associated temperature rises of the motor or the motor drive system. In other examples, operating under maximum efficiency can allow the electric vehicle to capture as much regeneration energy as possible.

In an example, at any same or near same speed, battery voltage, or torque command (e.g., an absolute value of the torque command), a flux command for maximum efficiency can be significantly different in a motoring mode than in a generating or regeneration mode. Therefore, it can be desirable to have separate lookup tables or other functions to calculate, set, or otherwise determine the flux command. It can also be desirable to apply a correction based on battery voltage in a similar way.

In an example, the first regeneration setting can correspond to a limited torque under the maximum regeneration power allowed by the battery, resulting in a maximum vehicle range before recharge.

Flux Command for a Second Regeneration Setting

In an example, the second regeneration setting or mode can include a power limit mode. The second regeneration setting can correspond to high regeneration torque under the maximum regeneration power allowed by the battery, resulting in a maximum vehicle range.

Figure 11:
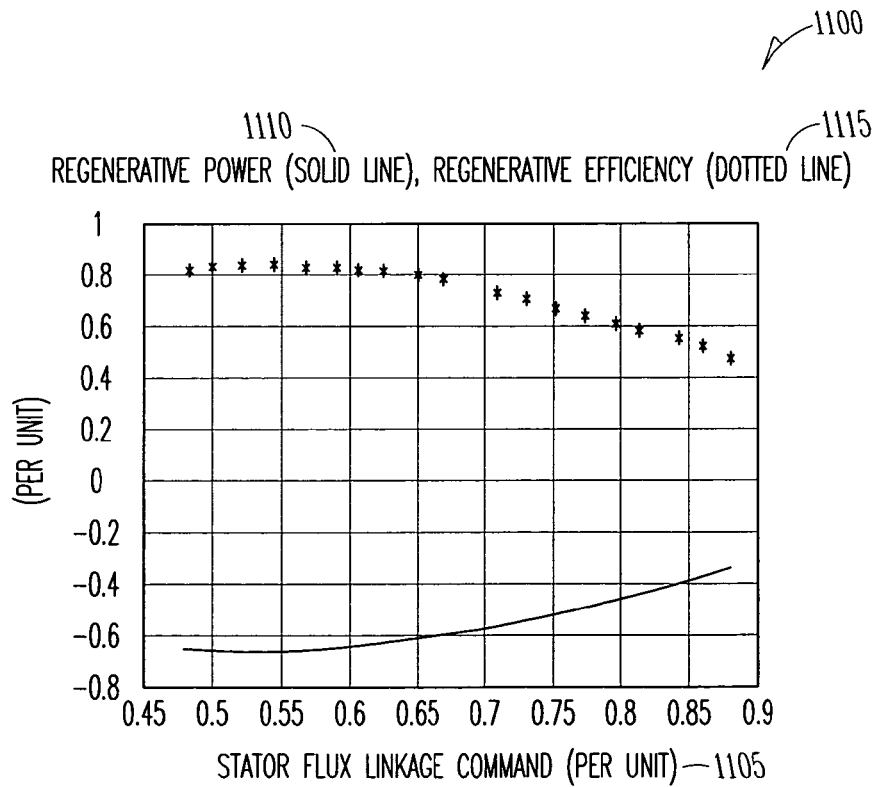

FIG. 11 illustrates generally an example of a relationship 1100 between a stator flux linkage command 1105, regeneration power 1110, and regenerative efficiency 1115. As shown in FIG. 11, the regeneration power 1110 can significantly vary as the stator flux linkage command 1105 increases. In an example, by selecting an appropriate flux command (e.g., generally a higher flux command), a high regeneration torque can be achieved while maintaining the regeneration power 1110 under the power limit. This can be accompanied by a decrease in the motor efficiency, which can mean substantially increased motor losses and temperature rise. In this example, the motor can be used to absorb excessive braking energy. Conventionally, a large mechanical brake coupled to the shaft can be used for this purpose. In certain examples, the capacity requirement for the large mechanical brake can be reduced by using the motor to absorb friction energy due to the high braking wheel torque.

In an example, it can be desirable to have a separate lookup table or other function for this mode. It can also be desirable to apply a correction based on the battery voltage in a similar way.

In an example, using the motor to absorb braking energy can result in a significant braking wheel torque (e.g., the motor braking torque in combination with mechanical braking torque), which can result in a significant vehicle deceleration. In certain examples, some operation or system aspects are improved such as a reduced safety stopping distance and reduced mechanical brake stresses. In various examples, monitoring the motor temperature rise helps to disable or cut back this mode.

In an example, compared to the torque limit mode occurring during the first regeneration mode, the power limit mode can have a more aggressive regeneration, providing a maximum allowed energy recovery as well as potentially a more lively traction response similar to that available in a high performance sports or track car.

Flux Command for Thermal Management

In an example, as the rotor heats up during operation, a thermal mode with rotor loss cutback can be selected to provide a determinable (e.g., maximum) rotor cooling of the electric vehicle.

Figure 12:
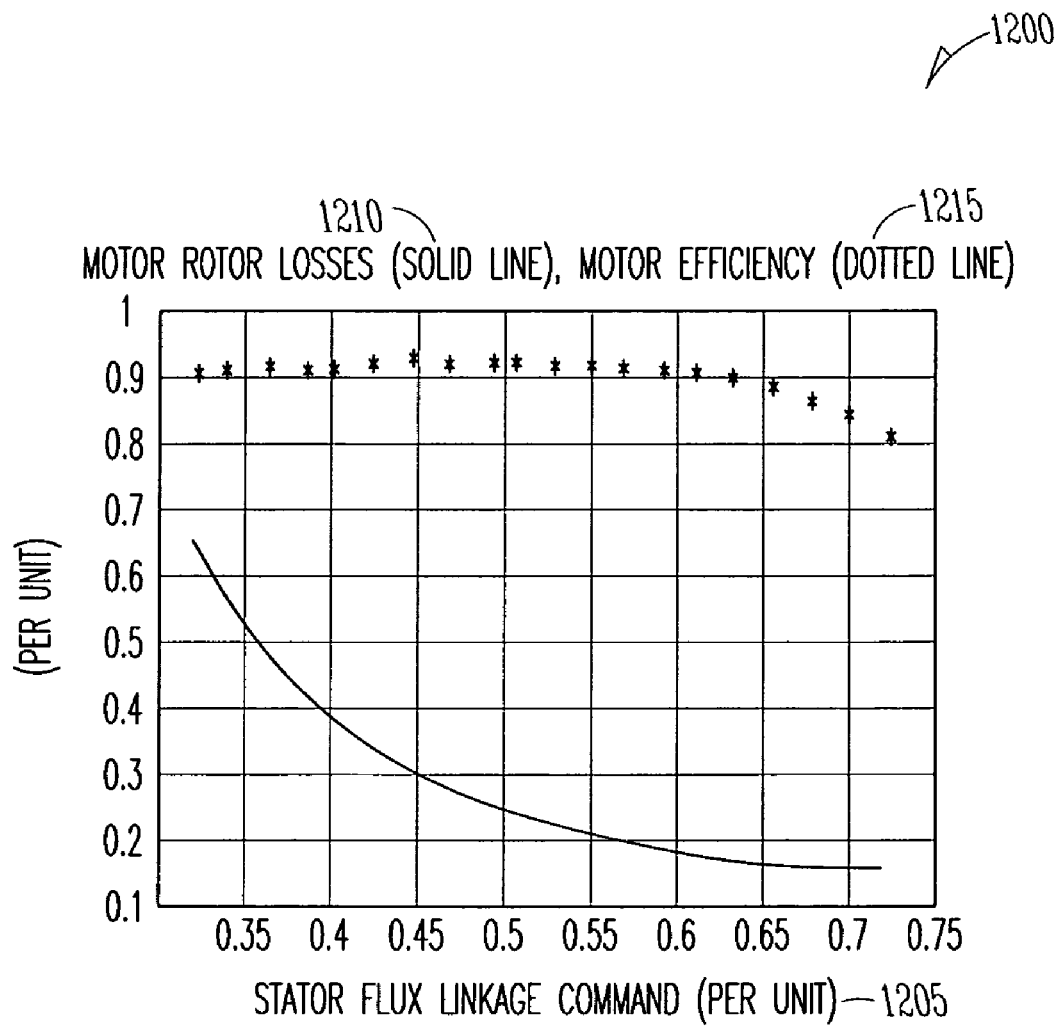

FIG. 12 illustrates generally an example of a relationship 1200 between the stator flux linkage command 1205, motor rotor losses 1210, and motor efficiency 1215. In the example of FIG. 12 (e.g., to achieve a constant torque command), as the stator flux increases, the stator and rotor total loss (e.g., including copper loss, iron loss, etc.) can decrease (e.g., motor efficiency increases) until a minimum point. In certain examples, once the total loss has reached the minimum point, it can then increase. In an example, the minimal point can represent an optimal balance of the flux-producing current and the torque-producing current components of the stator current resulting in an optimal efficiency. Generally, as shown in FIG. 12, the rotor losses (e.g., including copper loss, iron loss, etc.) can keep decreasing as rotor current amplitude decreases. In an example, torque production can fundamentally be a production of the air-gap magnetic field cutting through the rotor windings. Higher air-gap flux density (e.g., as a result of the higher stator flux linkage) can result in lower slip speed. Hence, lower induced rotor currents can be used to produce the same torque.

As discussed earlier, it can sometimes be advantageous to reduce the rotor losses, even at the cost of increased stator losses. The stator temperature rise due to the stator losses and other losses can be independently monitored, and in general torque command can be cut back when the maximum stator temperature rise is exceeded. In an example, a flux command can be used as a means to cut back rotor losses while meeting torque command.

In an example, the flux level to achieve a certain significant degree of loss balancing can be characterized as a function of torque. In an example, this flux level can be corrected at the second or third speed ranges by the battery voltage. In certain examples, the thermal mode (e.g., the rotor loss cutback flux determination) can be entered based on the level of the real-time estimated rotor temperature comparing to a limit.

Regeneration Setting Examples

Figure 13:
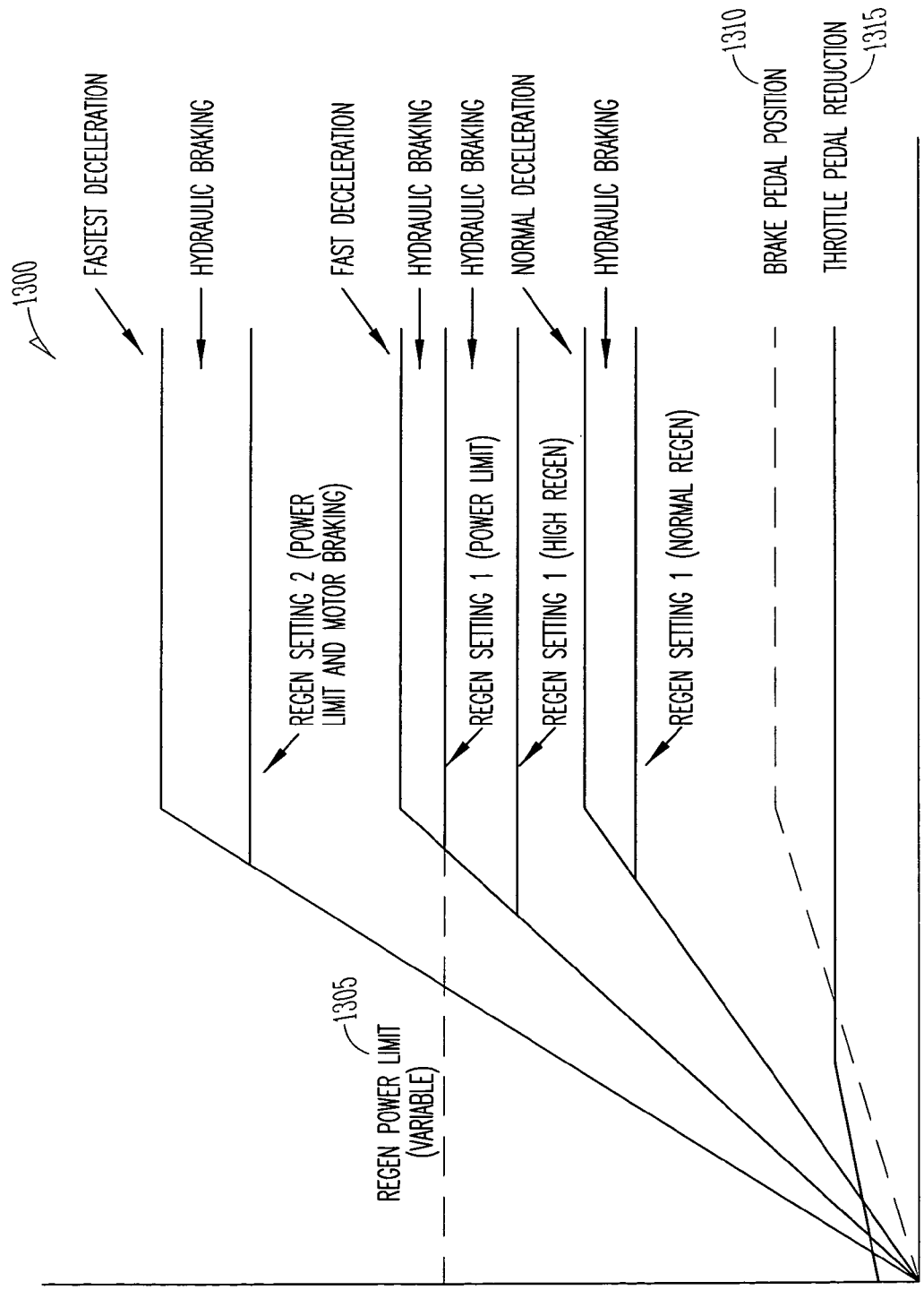
FIG. 13 illustrates generally an example of regeneration relationships.

FIG. 13 illustrates generally an example of a relationship 1300 between a regeneration power limit 1305, a brake pedal position 1310, and a throttle pedal position 1315. In an example, FIG. 13 illustrates examples of one or more of the regeneration modes (e.g., the first regeneration setting ("Regen Setting 1"), the second regeneration setting ("Regen Setting 2"), etc.) across one or more varying levels of deceleration (e.g., normal deceleration, fast deceleration, fastest deceleration, etc.). In an example, the regeneration power limit 1305 can include a variable regeneration power limit mode. In an example, the regeneration power limit 1305 can include or be influenced by one or more system component limits, such as an inverter current limit, a battery state of charge, etc.

Flux Mode Management

In various examples, the condition for selecting one or more modes has been generally discussed. In an example, the modes can be selected based on one or more of battery state-of-charge, thermal feedbacks, vehicle settings, driver inputs, system control, system diagnosis, or one or more other driver inputs or vehicle information. In certain examples, a default setting can include the maximum efficiency mode and the first regeneration mode. The one or more modes can change manually, such as by using information directly from the user as to a desired mode, or the one or more modes can change automatically, such as by user input or vehicle information. An example of changing modes can include:

First, starting at a default setting, including the maximum efficiency mode and the first regeneration mode. Then, when a throttle (or torque command input) is hard pressed, the vehicle settings can change (e.g., automatically or manually) to the maximum performance mode (e.g., still using the first regeneration mode). Then, when highway cruising is detected or selected, the vehicle settings can change back to maximum efficiency mode (e.g., still using the first regeneration mode). When highway passing is detected or desired, the vehicle settings can change back to the maximum performance mode. When the battery level changes (e.g., when the battery is low), the maximum performance mode (or one or more other modes) can be compensated due to the low battery voltage. When the rotor temperature reaches a threshold, the thermal mode can be activated, further limiting or affecting the vehicle operation. When the brake is hard pressed, the regeneration setting can be changed from the first regeneration mode to the second regeneration mode to assist in braking. In an example, the multiple flux modes can exemplify the flexibility provided in such an electric vehicle to allow user behavior to influence driving range or dynamic performance, within the boundaries of vehicle characteristics and vehicle safety.

Method Example

Figure 14:
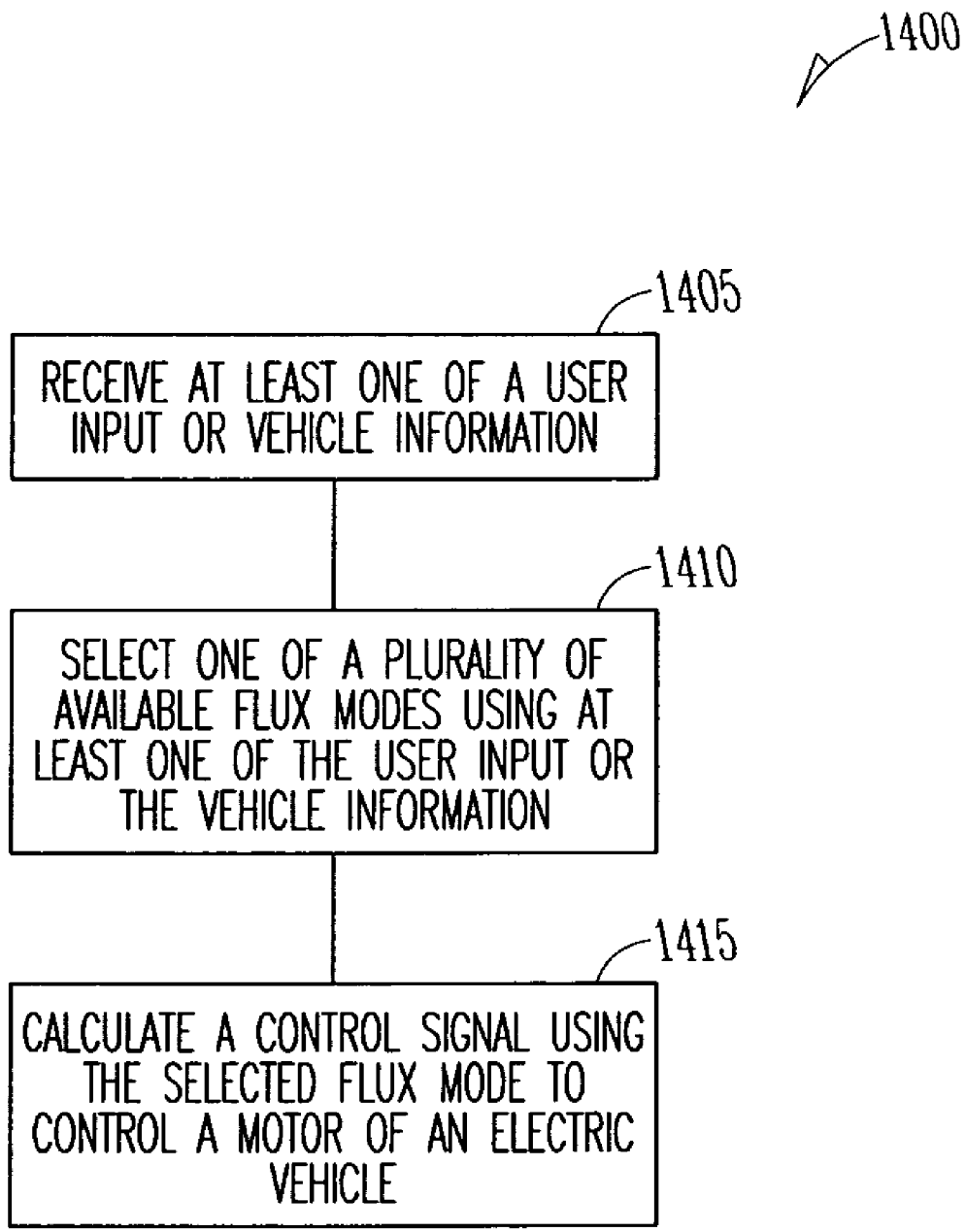
FIG. 14 illustrates generally an example of a method including calculating a control signal using a selected flux mode.

FIG. 14 illustrates generally an example of a method 1400 including calculating a control signal using a selected flux mode.

At 1405, at least one of a user input or vehicle information can be received. In an example, at 1405, a user input can be received. The user input can include one or more specified or determinable modes for the electric vehicle, such as a performance mode, an efficiency mode, a regeneration mode, a thermal mode, or one or more other modes. At 1410, one of a plurality of available flux modes can be selected using at least one of the user input or the vehicle information. In an example, the plurality of available flux modes can include one or more specified or determinable modes, such as one or more of the performance mode, the efficiency mode, the regeneration mode, the thermal mode, or one or more other modes. In an example, the plurality of modes can include at least one of a performance mode or an efficiency mode. In an example, separate from or in conjunction with the performance mode or the efficiency mode, the specified or determinable mode can include a regeneration mode. In an example, the regeneration mode can include a first regeneration mode configured to deliver a determinable regeneration of the electric vehicle and a second regeneration mode configured to deliver a determinable braking of the electric vehicle. Further, in certain examples, separate from or in conjunction with any one or more of the modes listed above, the specified or determinable mode can include a thermal mode.

In an example, at least one of the thermal mode, the first regeneration mode, or the second regeneration mode can be selected, alone or in combination with one or more of the performance mode or the efficiency mode.

In an example, under normal driving or by default or selection, the efficiency mode can be selected. Regarding regeneration, under normal driving or by default, the first regeneration setting can be selected.

In an example, under performance driving or by selection, the performance mode can be selected. Regarding regeneration, under performance driving or by default, the second regeneration mode can be selected.

In various examples, such as during one or more of the selectable or determinable modes, the rotor of the electric vehicle can heat up. In an example, a thermal mode, when the heat of the rotor approaches or surpasses a threshold, can be applied separate from or in conjunction with one or more of the performance mode, the efficiency mode, the first regeneration mode or the second regeneration mode.

At 1415, a control signal can be calculated to control a motor of an electric vehicle using the selected flux mode. In an example, the control signal can be calculated as described above.

Additional Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown and described. However, the present inventor also contemplates examples in which only those elements shown and described are provided.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. An apparatus comprising:
   a motor controller to:
      receive a user input, wherein the user input is selected from a group of specified modes that includes at least two of:
         (1) a performance mode;
         (2) an efficiency mode;
         (3) a regeneration mode;
         (4) a thermal mode; or
         (5) a traction mode;
      select one of a plurality of available flux modes using the user input; and
      calculate a control signal, using the selected flux mode, to control a motor of an electric vehicle.

2. The apparatus of claim 1, wherein the motor controller is configured to:
   receive a driver input including a torque command value;
   calculate, at the torque command value, a first flux value according to the selected flux mode;
   calculate a first torque-producing current value as a function of the torque command value and of the first flux value; and
   calculate the control signal to control the motor of the electric vehicle using the first flux value and the first torque-producing current value.

3. The apparatus of claim 1, wherein the motor controller is configured to:
   receive the user input, the user input further including a torque command value; and
   select the flux mode using the torque command value.

4. The apparatus of claim 3, wherein the motor controller is configured to:
   receive a first torque command value at a first time;
   receive a second torque command value at a second different time; and
   select the flux mode using the first and second torque command values.

5. An apparatus comprising:
   a motor controller to:
      receive at least one of a user input or vehicle information;
      select one of a plurality of available flux modes using at least one of the user input or the vehicle information, wherein the plurality of flux modes include at least two of:
         (1) a performance mode to provide a flux to deliver a determinable available torque of the electric vehicle;
         (2) an efficiency mode to provide a flux to deliver a determinable efficiency of the electric vehicle; or
         (3) a regeneration mode to provide a flux to deliver a determinable regeneration efficiency of the electric vehicle; and
      calculate a control signal, using the selected flux mode, to control a motor of an electric vehicle, wherein the motor controller is configured to switch between at least one of the performance mode, the efficiency mode, or the regeneration mode using at least one of the user input or the vehicle information.

6. The apparatus of claim 5, wherein the determinable available torque of the electric vehicle includes a maximum available torque of the electric vehicle;
   wherein determinable efficiency of the electric vehicle includes a maximum efficiency of the electric vehicle; and
   wherein the determinable regeneration efficiency of the electric vehicle includes a maximum regeneration efficiency of the electric vehicle.

7. The apparatus of claim 5, wherein the motor controller is configured to receive the vehicle information including a rotor temperature;
   wherein the plurality of flux modes include a thermal mode to provide a flux to deliver a determinable rotor cooling of the electric vehicle; and
   wherein the motor controller is configured to switch between at least one of the performance mode, the efficiency mode, the regeneration mode, or the thermal mode using the received rotor temperature.

8. The apparatus of claim 7, wherein the determinable rotor cooling of the electric vehicle includes a maximum rotor cooling of the electric vehicle.

9. The apparatus of claim 5, wherein the regeneration mode includes:
   (1) a first regeneration mode to provide a flux to deliver a determinable regeneration of the electric vehicle; and
   (2) a second regeneration mode to provide a flux to deliver a determinable braking of the electric vehicle; and
   wherein the motor controller is configured to switch between at least one of the performance mode, the efficiency mode, the first regeneration mode, or the second regeneration mode using at least one of the user input or the vehicle information.

10. The apparatus of claim 9, wherein the determinable regeneration of the electric vehicle includes a maximum allowable regeneration of the electric vehicle; and
    wherein the determinable braking of the electric vehicle includes a maximum braking assistance of the electric vehicle.

11. The apparatus of claim 5, wherein the motor includes an induction motor.

12. The apparatus of claim 5, wherein the motor controller is to receive a run-time torque command value and to select a flux mode of the motor during operation of the motor in the electric vehicle, the selecting the one of the plurality of available flux modes including selecting according to the run-time torque command value.

13. A method comprising:
receiving a user input, wherein the user input is selected from a group of specified modes that includes at least two of:
(1) a performance mode;
(2) an efficiency mode;
(3) a regeneration mode;
(4) a thermal mode; or
(5) a traction mode;
selecting one of a plurality of available flux modes using the user input; and
calculating a control signal, using the selected flux mode, to control a motor of an electric vehicle.

14. A method of claim 13, wherein the receiving the user input includes receiving a torque command value; and
wherein the calculating the control signal includes:
calculating, at the torque command value, a first flux value according to the selected flux mode;
calculating a first torque-producing current value as a function of the torque command value and of the first flux value; and
calculating the control signal to control the motor of the electric vehicle using the first flux value and the first torque-producing current value.

15. A method comprising:
receiving at least one of a user input or vehicle information;
selecting one of a plurality of available flux modes using at least one of the user input or the vehicle information, wherein the selecting the one of the plurality of available flux modes includes selecting from at least two of:
(1) a performance mode to provide a flux to deliver a determinable available torque of the electric vehicle;
(2) an efficiency mode to provide a flux to deliver a determinable efficiency of the electric vehicle; or
(3) a regeneration mode to provide a flux to deliver a determinable regeneration efficiency of the electric vehicle; and
calculating a control signal, using the selected flux mode, to control a motor of an electric vehicle, wherein the method includes switching between at least one of the performance mode, the efficiency mode, or the regeneration mode using at least one of the user input or the vehicle information.

16. The method of claim 15, wherein the receiving the vehicle information includes receiving a rotor temperature;
wherein the selecting the one of the plurality of available flux modes includes selecting a thermal mode to provide a flux to deliver a determinable rotor cooling of the electric vehicle; and
wherein the method includes switching between at least one of the performance mode, the efficiency mode, the regeneration mode, or the thermal mode using the received rotor temperature.

17. The method of claim 15, wherein the selecting the regeneration mode includes selecting:
(1) a first regeneration mode to provide a flux to deliver a determinable regeneration of the electric vehicle; or
(2) a second regeneration mode to provide a flux to deliver a determinable braking of the electric vehicle; and
wherein the method includes switching between at least one of the performance mode, the efficiency mode, the first regeneration mode, or the second regeneration mode using at least one of the user input or the vehicle information.

* * * * *